United States Patent
Wexler et al.

(10) Patent No.: US 7,554,538 B2
(45) Date of Patent: Jun. 30, 2009

(54) VIDEO PROCESSING, SUCH AS FOR HIDDEN SURFACE REDUCTION OR REMOVAL

(75) Inventors: Daniel Elliott Wexler, Soda Springs, CA (US); Larry I. Gritz, Berkeley, CA (US)

(73) Assignee: nVidia Corporation, Santa Clara, CA (US)

( * ) Notice: Subject to any disclaimer, the term of this patent is extended or adjusted under 35 U.S.C. 154(b) by 244 days.

(21) Appl. No.: 10/817,692

(22) Filed: Apr. 2, 2004

(65) Prior Publication Data

US 2005/0225670 A1  Oct. 13, 2005

(51) Int. Cl.
*G06T 15/00* (2006.01)

(52) U.S. Cl. .................. 345/418; 345/422; 345/611; 345/613; 345/614

(58) Field of Classification Search ........... 345/418, 345/619–689, 473–475
See application file for complete search history.

(56) References Cited

U.S. PATENT DOCUMENTS

| 5,283,860 | A |   | 2/1994 | Einkauf et al. |   |
|---|---|---|---|---|---|
| 5,600,763 | A | * | 2/1997 | Greene et al. | 345/420 |
| 5,701,404 | A |   | 12/1997 | Stevens et al. |   |
| 5,808,628 | A | * | 9/1998 | Hinson et al. | 345/547 |
| 5,850,230 | A | * | 12/1998 | San et al. | 345/501 |
| 5,977,986 | A |   | 11/1999 | Coelho |   |
| 6,377,265 | B1 | * | 4/2002 | Bong | 345/505 |
| 6,426,755 | B1 | * | 7/2002 | Deering | 345/581 |
| 6,614,445 | B1 | * | 9/2003 | Dorbie | 345/582 |
| 6,809,739 | B2 |   | 10/2004 | Farinelli et al. |   |
| 6,853,377 | B2 |   | 2/2005 | Pharr |   |
| 6,876,362 | B1 |   | 4/2005 | Newhall, Jr. et al. |   |
| 6,999,100 | B1 | * | 2/2006 | Leather et al. | 345/611 |
| 7,015,914 | B1 | * | 3/2006 | Bastos et al. | 345/506 |
| 7,061,502 | B1 |   | 6/2006 | Law et al. |   |
| 7,071,937 | B1 | * | 7/2006 | Collodi | 345/426 |
| 7,091,979 | B1 | * | 8/2006 | Donovan | 345/530 |
| 7,119,810 | B2 |   | 10/2006 | Sumanaweera et al. |   |
| 7,180,523 | B1 |   | 2/2007 | Macri |   |
| 2003/0043169 | A1 | * | 3/2003 | Hunter | 345/611 |
| 2003/0227457 | A1 | * | 12/2003 | Pharr et al. | 345/426 |
| 2004/0207623 | A1 | * | 10/2004 | Isard et al. | 345/426 |
| 2005/0225670 | A1 |   | 10/2005 | Wexler |   |

OTHER PUBLICATIONS

Abraham Mammen. Transparency and Antialiasing Algorithms Implemented with the Virtual Pixel Maps Technique. IEEE Computer Graphics and Applications, vol. 9, Issue 4: 43-55, Jul. 1989.*
Abraham Mammen. Transparency and Antialiasing Algorithms Implemented withthe Virtual Pixel Maps Technique. IEEE Computer Graphics and Applications, vol. 9, Issue 4:43-55, Jul. 1989.*

(Continued)

*Primary Examiner*—Kee M Tung
*Assistant Examiner*—Andrew Yang
(74) *Attorney, Agent, or Firm*—Berkeley Law & Technology Group, LLP

(57) ABSTRACT

Embodiments of methods, apparatuses, devices, and/or systems for video processing, such as for hidden surface removal or reduction, are described.

43 Claims, 9 Drawing Sheets

OTHER PUBLICATIONS

Everitt ("Interactive Order-Independent Transparency"), May 15, 2001.*

Heckbert et al., "Beam Tracing Polygonal Objects", Computer Graphics, vol. 18, No. 3, Jul. 1984,pp. 119-127.

Shinya, et al., "Principles and Applications of Pencil Tracing", Computer Graphics, vol. 21, No. 4, Jul. 1987, pp. 45-54.

Shantz, et al., "Rendering Trimmed Nurbs With Adaptive Forward Differencing", Computer Graphics, vol. 22, No. 4, Aug. 1988, pp. 189-198.

Rockwood, et al., "Real-Time Rendering of Trimmed Surfaces", Computer Graphics, vol. 23, No. 3, Jul. 1989, pp. 107-116.

Haeberli, et al., "The Accumulation Buffer: Hardware Support for High-Quality Rendering", Computer Graphics, vol. 24, No. 4, Aug. 1990, pp. 309-318.

Kumar, et al., "Efficient Rendering of Trimmed Nurbs Surfaces", Apr. 23, 1995, pp. 1-28.

Pharr, et al., "Rendering Complex Scenes With Memory-Coherent Ray Tracing", Computer Science Dept., Stanford University, 1997, 8 Pgs.

Peercy, et al., "Interactive Multi-Pass Programmable Shading", ACM 2000, pp. 425-432.

"Order-Independent Transparency Rendering System and Method", U.S. Appl. No. 09/944,988, filed Aug. 31, 2001, 35 Pgs.

Proudfoot, et al., "A Real-Time Procedural Shading System for Programmable Graphics Hardware", 2001 ACM, pp. 159-170.

Lindhold, et al., "A User-Programmable Vertex Engine", NVIDIA Corporation, 2001 ACM, pp. 149-158.

Purcell, et al., "Ray Tracing on Programmable Graphics Hardware", Stanford University, 2002 ACM, pp. 703-712.

Dave Zenz, "Advances in Graphics Architectures", Dell Graphics Technologist, Sep. 2002 Dell Computer Corporation, pp. 1-6.

Carr, et al. "The Ray Engine", University of Illinois, Graphics Hardware 2002, 10 Pgs.

.Kapasi, et al., "Programmable Stream Processors", Computer.org, vol. 36, No. 8, Aug. 2003 IEEE Computer Society, pp. 1-14.

Peter Djeu, "Graphics on a Stream Processor", Mar. 20, 2003, 53 Pgs.

Stan Tomov, "Numerical Simulations Using Programmable GPUs" Data Analysis and Visualization, Sep. 5, 2003, Brookhaven Science Associates, 16 Pgs.

"Last Time", CS679—Fall 2003—Copyright Univ. of Wisconsin, 23 Pgs.

Michael Haller, "Shader Programming Cg, NVIDIA's Shader Language", 2003, www.nvidia.com, 45 Pgs.

David Luebke, "Programmable Graphics Hardware", Nov. 20, 2003, 22 Pgs.

Polyglot, "What Are These Pixel Shaders of Which You Speak", Oct. 28, 2003, Kuro5hin, www.kuro5hin.org, pp. 1-11.

Michael Macedonia, "The GPU Enters Computing's Mainstream", 2003 IEEE, pp. 1-5.

Office Action mailed Feb. 8, 2007, in related matter U.S. Appl. No. 10/792,497, filed Mar. 2, 2004.

Response dated May 8, 2007, to Office Action dated Feb. 8, 2007, in related matter U.S. Appl. No. 10/792,497, filed Mar. 2, 2004.

Office Action mailed Jul. 27, 2007, in related matter U.S. Appl. No. 10/792,497, filed Mar. 2, 2004.

Response dated Sep. 27, 2007, to Office Action dated Jul. 27, 2007, in related matter U.S. Appl. No. 10/792,497, filed Mar. 2, 2004.

Advisory Action mailed Oct. 15, 2007, in related matter U.S. Appl. No. 10/792,497, filed Mar. 2, 2004.

Response dated Oct. 29, 2007, to Office Action dated Jul. 27, 2007, and further to Advisory Action dated Oct. 15, 2007, in related matter U.S. Appl. No. 10/792,497, filed Mar. 2, 2004.

Office Action mailed Dec. 4, 2007, in related matter U.S. Appl. No. 10/792,497, filed Mar. 2, 2004.

Response dated Mar. 4, 2008, to Office Action dated Dec. 4, 2007, in related matter U.S. Appl. No. 10/792,497, filed Mar. 2, 2004.

RCE and Amendment for related U.S. Appl. No. 11/229,458 dated Feb. 11, 2009.

Final Office Action for related U.S. Appl. No. 11/229,458 dated Nov. 12, 2008.

Non-Final Office Action for related U.S. Appl. No. 10/792,497 dated Feb. 2, 2009.

RCE and Amendment for related U.S. Appl. No. 10/792,497 dated Dec. 29, 2008.

* cited by examiner

VIDEO PROCESSING, SUCH AS FOR HIDDEN SURFACE REDUCTION OR REMOVAL

BACKGROUND

This disclosure is related to video processing, such as for hidden surface reduction or removal.

Computer graphics is an extensive field in which a significant amount of hardware and software development has taken place over the last twenty years or so. See, for example, *Computer Graphics: Principles and Practice*, by Foley, Van Dam, Feiner, and Hughes, published by Addison-Wesley, 1997. Typically, in a computer platform or other similar computing device, dedicated graphics hardware is employed in order to render graphical images, such as those used in connection with computer games, for example. For such systems, dedicated graphics hardware may be limited in a number of respects that have the potential to affect the quality of the graphics, including hardware flexibility and/or rendering capability. However, higher quality graphics continues to be desirable as the technology and the marketplace continues to evolve. Thus, signal processing and/or other techniques to extend the capability of existing hardware in terms of the quality graphics that may be produced continue to be an area of investigation.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Computer graphics is an extensive field in which a significant amount of hardware and software development has taken place over the last twenty years or so. See, for example, *Computer Graphics: Principles and Practice*, by Foley, Van Dam, Feiner, and Hughes, published by Addison-Wesley, 1997. Typically, in a computer platform or other similar computing device, dedicated graphics hardware is employed in order to render graphical images, such as those used in connection with computer games, for example. For such systems, dedicated graphics hardware may be limited in a number of respects that have the potential to affect the quality of the graphics, including hardware flexibility and/or rendering capability. However, higher quality graphics continues to be desirable as the technology and the marketplace continues to evolve. Thus, signal processing and/or other techniques to extend the capability of existing hardware in terms of the quality graphics that may be produced continue to be an area of investigation.

As previously discussed, dedicated graphics hardware may be limited in its capabilities, such as its graphics rendering capabilities and/or its flexibility. This may be due at least in part, for example, to the cost of hardware providing improved abilities relative to the demand for such hardware. Despite this, however, in recent years, the capabilities of dedicated graphics hardware provided on state-of-the-art computer platforms and/or similar computing systems have improved and continue to improve. For example, fixed function pipelines have been replaced with programmable vertex and fragment processing stages. As recently as 6 years ago, most consumer three-dimensional (3D) graphics operations were principally calculated on a CPU and the graphics card primarily displayed the result as a frame buffer. However, dedicated graphics hardware has evolving into a graphics pipeline comprising tens of millions of transistors. Today, a programmable graphics processing unit (GPU) is capable of more than simply feed-forward triangle rendering. State-of-the art graphics chips, such as the NVIDIA GeForce FX and the ATI Radon 9800, for example, replace fixed-function vertex and fragment processing stages with programmable stages, as described in more detail hereinafter. These programmable vertex and fragment processing stages have the capability to execute programs allowing control over shading and/or texturing calculations, as described in more detail hereinafter.

Figure 1:
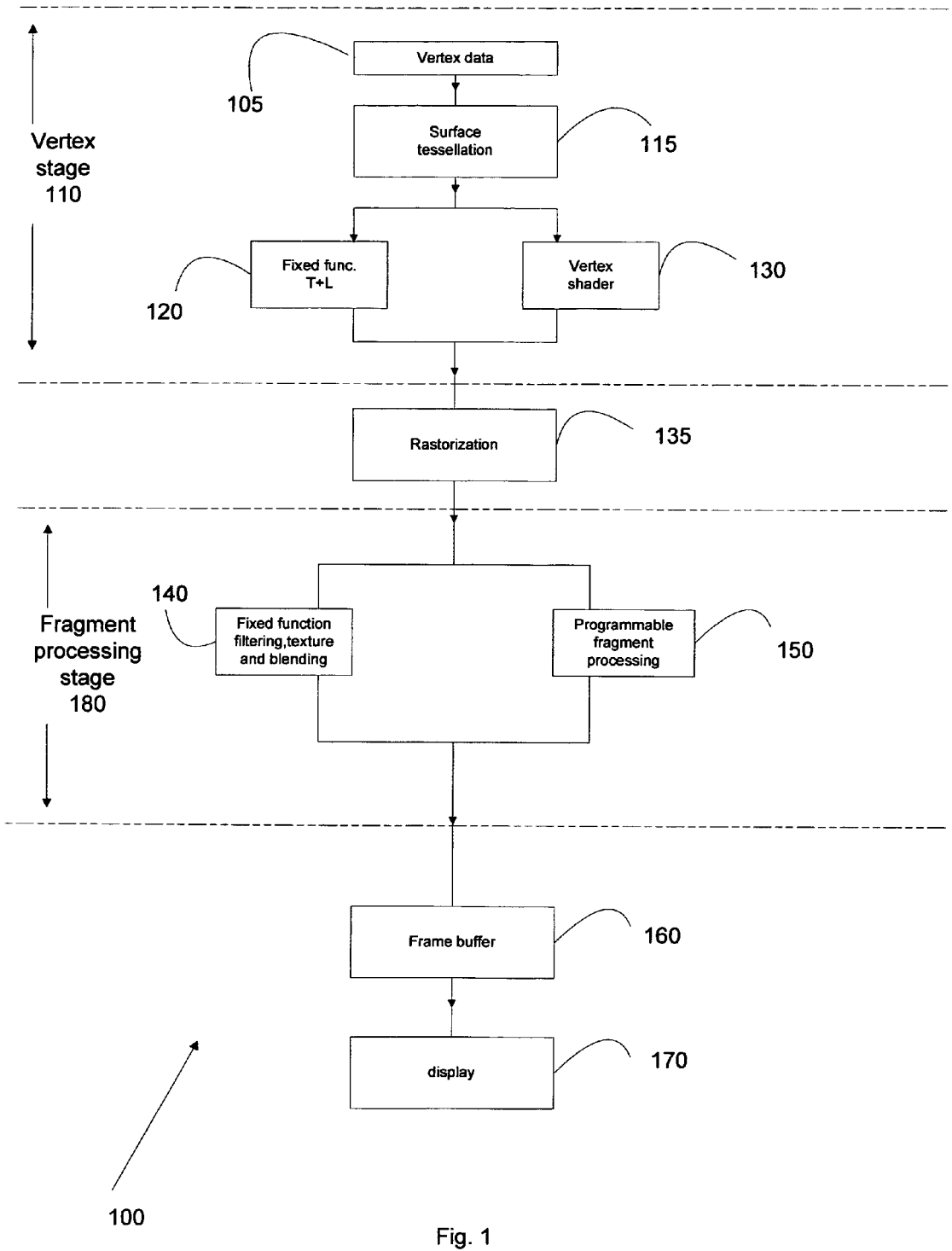
FIG. 1 is a schematic diagram illustrating an embodiment of a typical graphics pipeline.

Similar to CPU architectures, a GPU may be broken down into pipeline stages. However, whereas a CPU embodies a general purpose design used to execute arbitrary programs, a GPU is architected to process raw geometry data and eventually represent that information as pixels on a display, such as a monitor, for example. FIG. 1 is a block diagram conceptualization of a typical graphics pipeline.

Typically, for an object to be drawn, the following operations are executed by such a pipeline:

1. An application executing on a CPU may instruct a GPU where to find vertex data, such as 105, within a portion of memory.
2. Vertex stage 110 may transform the vertex data from model space to clip space and may perform lighting calculations, etc.
3. Vertex stage 110 may generate texture coordinates from mathematical formulae.
4. Primitives, such as triangle, points, quadrangles, and the like, may be rasterized into fragments.
5. Fragment color may be determined by processing fragments through fragment processing stage 180, which may also perform, among other operations, texture memory look-ups.

6. Some tests may be performed to determine if fragments should be discarded.
7. Pixel color may be calculated based at least in part on fragment color and other operations typically involving fragments' or pixels' alpha channel.
8. Pixel information may be provided to frame buffer 160.
9. Pixels may be displayed, such as by display 170.

Figure 7:
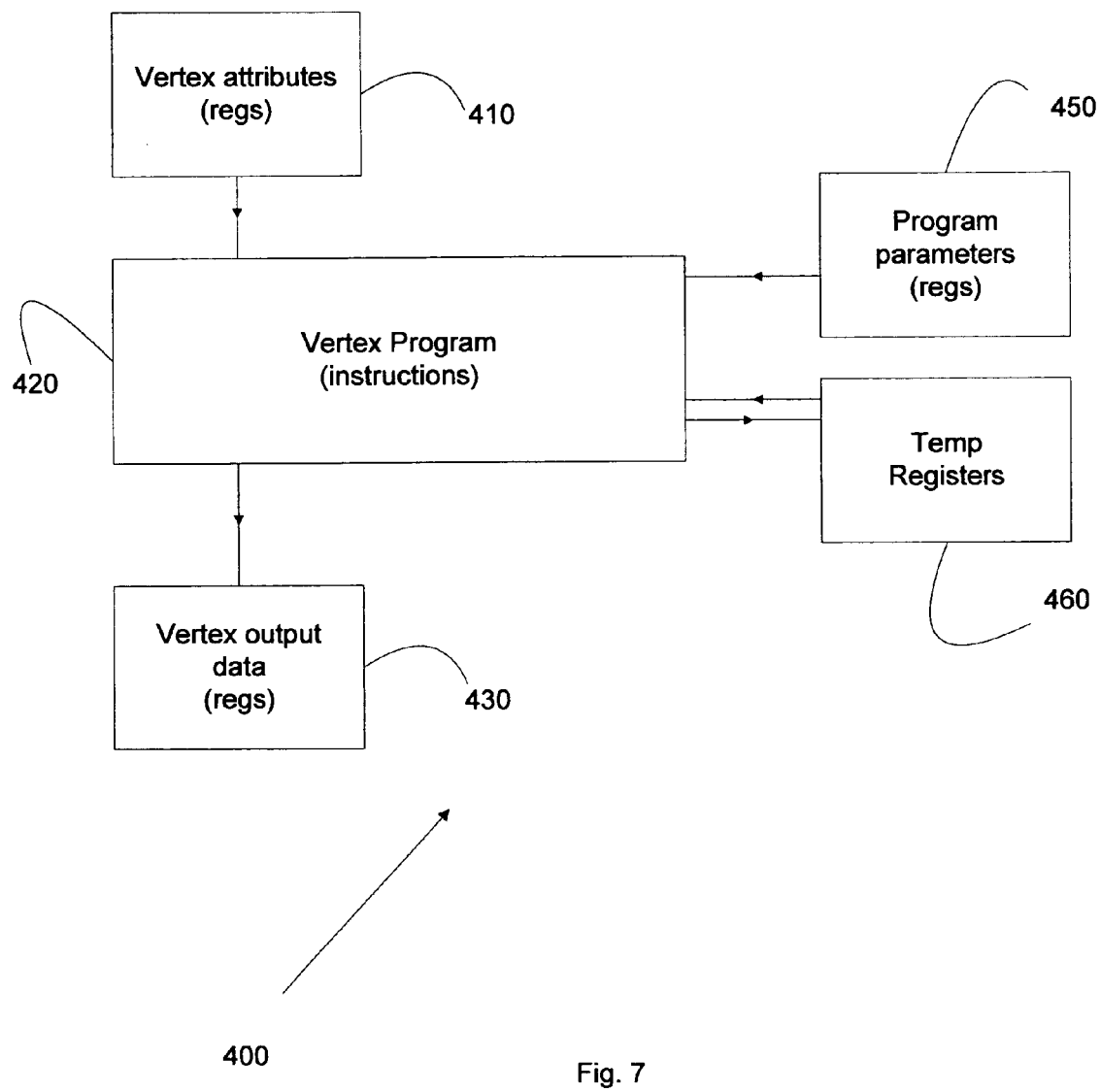
FIG. 7 is a schematic diagram illustrating an embodiment of a programmable vertex shader.

As illustrated by block 120 and previously suggested, a graphics pipeline typically will perform transform and lighting (T & L) operations and the like. Block 120 depicts a fixed-function unit; however, these operations are being replaced more and more by programmable vertex units, such as 130, also referred to as vertex shaders. Vertex shader 130 applies a vertex program to a stream of vertices. Therefore, the program processes data at the vertex level. Most operations are performed in one cycle, although this restriction need not apply. A typical vertex program is on the order of a hundred or more instructions. FIG. 7 is a block diagram illustrating an embodiment of a typical programmable vertex shader. As illustrated, vertex attributes 410 are applied to vertex program 420. The attributes are stored in registers and the program comprises a series of instructions that process the data in the registers. The resulting processed data, illustrated in FIG. 7 as vertex output data 430, is also stored in registers. Typically, while the program is executing, it will obtain program parameters, illustrated by 450 in FIG. 7, and it will utilize temporary registers, illustrated by 460 in FIG. 7.

Figure 8:
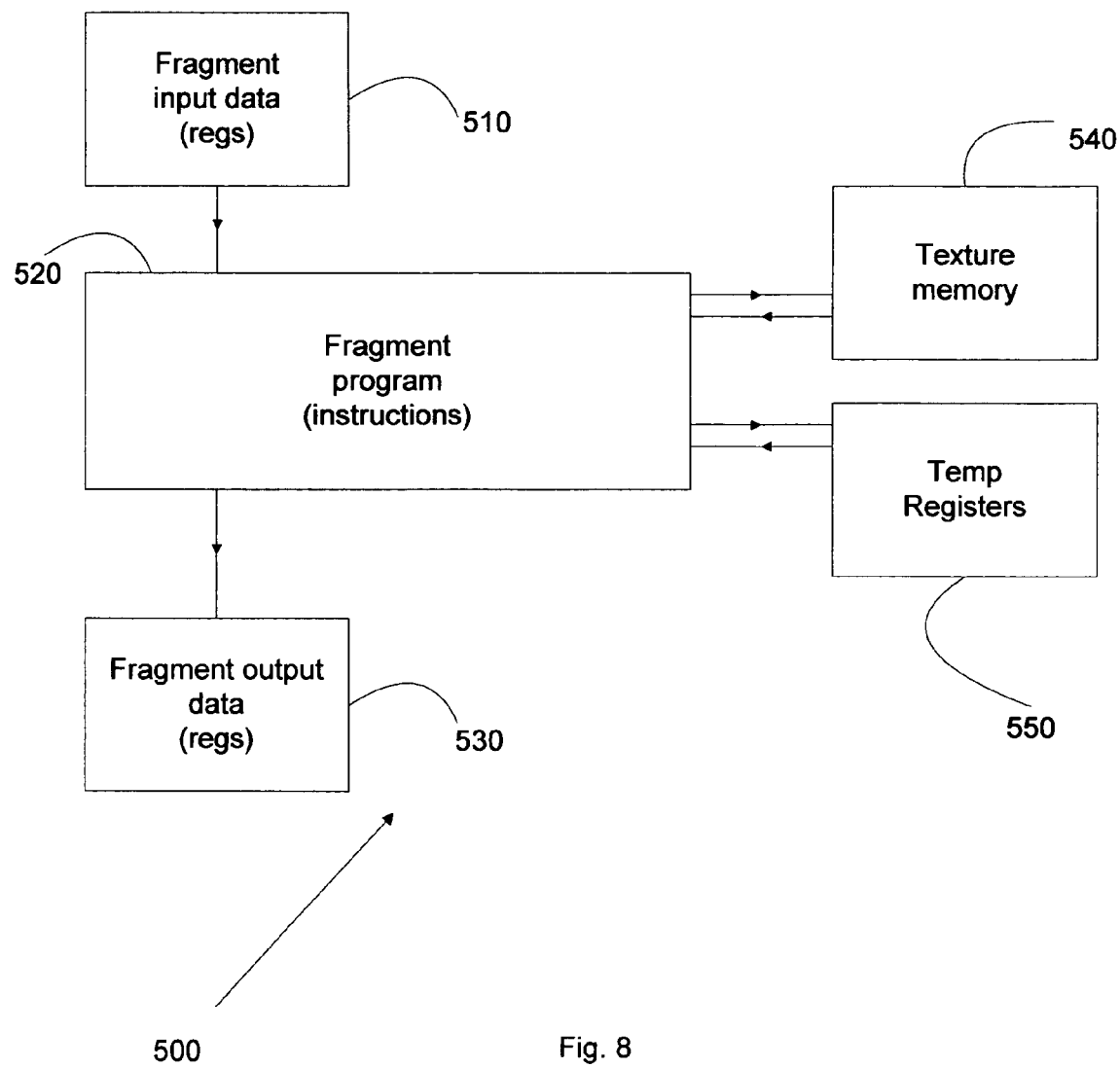
FIG. 8 is a schematic diagram illustrating an embodiment of a programmable pixel shader.

As with the vertex stage, the fragment processing stage has undergone an evolution from a fixed function unit, such as illustrated by block 140, to a programmable unit, such as illustrated by block 150. Thus, previously, texturing, filtering and blending were performed using fixed function state machines or similar hardware. As with vertex shaders, a pixel shader, such as 150, also referred to as a programmable fragment processing stage, permits customized programming control. Therefore, on a per pixel basis, a programmer is able to compute color and the like to produce desired customized visual effects. FIG. 8 is a block diagram illustrating an embodiment of a typical pixel shader or fragment processing stage. Similar to its counterpart in the vertex stage, embodiment 500 includes fragment input data 510, fragment program 520, and fragment output data 530. Likewise, this stage includes texture memory 540 and temporary registers 550. In this context, texture memory refers to a memory portion of the GPU included as part of a fragment processing stage, typically cache memory, where, following the execution of vertex processing and the like, particular pixel values may be loaded for additional processing, such as for filtering, shading, and/or similar processing, such as, for example, processing typically associated with creating the appearance of a visible surface of an object to be rendered.

These trends in programmability of the graphics pipeline have transformed the graphics processing unit (GPU) and its potential applications. Thus, one potential application of such a processor or processing unit is to accomplish high quality graphics processing, such as may be desirable for a variety of different situations, such as for creating animation and the like, for example. More specifically, in recent years, the performance of graphics hardware has increased more rapidly than that of central processing units (CPUs). As previously indicated, CPU designs are typically intended for high performance processing on sequential code. It is, therefore, becoming increasingly more challenging to use additional transistors to improve processing performance. In contrast, as just illustrated, programmable graphics hardware is designed for parallel processing of vertex and fragment stage code. As a result, GPUs are able to use additional transistors more effectively than CPUs to produce processing performance improvements. Thus, GPUs offer the potential to sustain processing performance improvements as semiconductor fabrication technology continues to advance.

Of course, programmability is a relatively recent innovation. Furthermore, a range of differing capabilities are included within the context of "programmability." For the discussion of this particular embodiment, focus will be placed upon the fragment processing stage of the GPU rather than the vertex stage, although, of course, the claimed subject matter is not limited in scope in this respect. Thus, in one embodiment, a programmable GPU may comprise a fragment processing stage that has a simple instruction set. Fragment program data types may primarily comprise fixed point input textures. Output frame buffer colors may typically comprise eight bits per color component. Likewise, a stage typically may have a limited number of data input elements and data output elements, a limited number of active textures, and a limited number of dependent textures. Furthermore, the number of registers and the number of instructions for a single program may be relatively short. The hardware may only permit certain instructions for computing texture addresses only at certain points within the program. The hardware may only permit a single color value to be written to the frame buffer for a given pass, and programs may not loop or execute conditional branching instructions. In this context, an embodiment of a GPU with this level of capability or a similar level of capability shall be referred to as a fixed point programmable GPU.

In contrast, more advanced dedicated graphics processors or dedicated graphics hardware may comprise more enhanced features. The fragment processing stage may be programmable with floating point instructions and/or registers, for example. Likewise, floating point texture frame buffer formats may be available. Fragment programs may be formed from a set of assembly language level instructions capable of executing a variety of manipulations. Such programs may be relatively long, such as on the order of hundreds of instructions or more. Texture lookups may be permitted within a fragment program, and there may, in some embodiments, be no limits on the number of texture fetches or the number of levels of texture dependencies within a program. The fragment program may have the capability to write directly to texture memory and/or a stencil buffer and may have the capability to write a floating point vector to the frame buffer, such as RGBA, for example. In this context, an embodiment of a GPU with this level of capability or a similar level of capability may be referred to as a floating point programmable GPU.

Likewise, a third embodiment or instantiation of dedicated graphics hardware shall be referred to here as a programmable streaming processor. A programmable streaming processor comprises a processor in which a data stream is applied to the processor and the processor executes similar computations or processing on the elements of the data stream. The system may execute, therefore, a program or kernel by applying it to the elements of the stream and by providing the processing results in an output stream. In this context, likewise, a programmable streaming processor which focuses primarily on processing streams of fragments comprises a programmable streaming fragment processor. In such a processor, a complete instruction set and larger data types may be provided. It is noted, however, that even in a streaming processor, loops and conditional branching are typically not capable of being executed without intervention originating external to the dedicated graphics hardware, such as from a CPU, for example. Again, an embodiment of a GPU with this level of capability or a similar level comprises a programmable streaming processor in this context.

Figure 2:
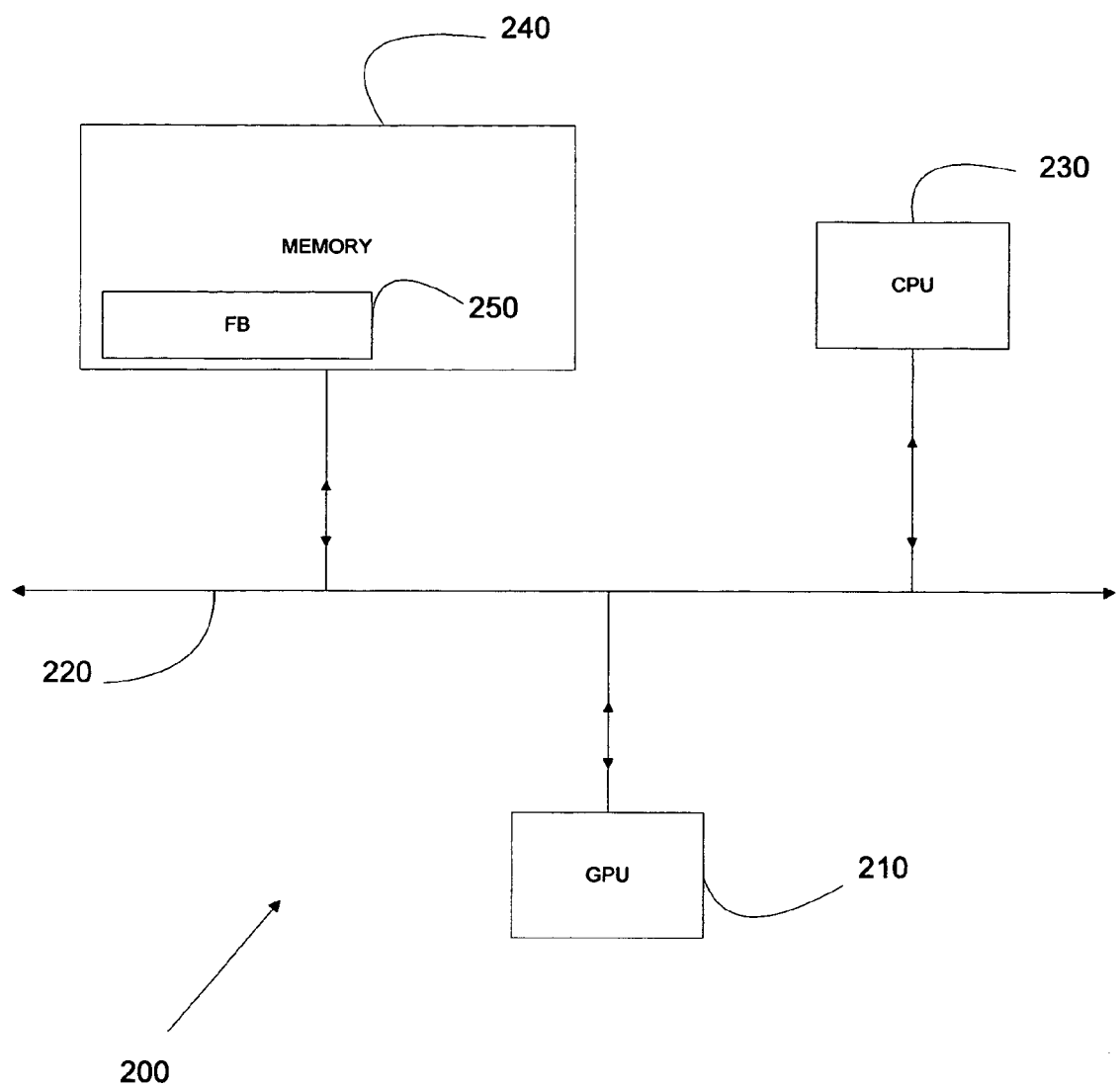
FIG. 2 is a schematic diagram of an embodiment of a computer platform that includes dedicated graphics hardware, such as a programmable GPU.

FIG. 2 is a schematic diagram illustrating an embodiment 200 comprising a system that may employ dedicated graphics hardware, such as, for example, GPU 210. It is noted that FIG. 2 is a simplified diagram for ease of discussion and illustration. Therefore, aspects such as a memory controller/arbiter, interface units to implement standard interface protocols, such as AGP and/or PCI, display devices, input devices, and the like have been omitted so as not to unnecessarily obscure the discussion.

In this particular embodiment, GPU 210 may comprise any instantiation of a programmable GPU, such as, for example, one of the three previously described embodiments, although for the purposes of this discussion, it is assumed that GPU 210 comprises a programmable floating point GPU. Likewise, it is, of course, appreciated that the claimed subject matter is not limited in scope to only the three types of GPUs previously described. These three are merely provided as illustrations of typical programmable GPUs. All other types of programmable GPUs currently known or to be developed later are included within the scope of the claimed subject matter. For example, while FIG. 2 illustrates discrete graphics hardware, alternatively, the graphics hardware may be integrated with the CPU on an IC and still remain within the scope of the claimed subject matter. Likewise, the applications of a system embodiment, such as the embodiment illustrated in FIG. 2, for example, include a host of possible applications, such as within or on: a desktop computing platform, a mobile computing platform, a handheld device, a workstation, a game console, a set-top box, a motherboard, a graphics card, and others.

Figure 6:
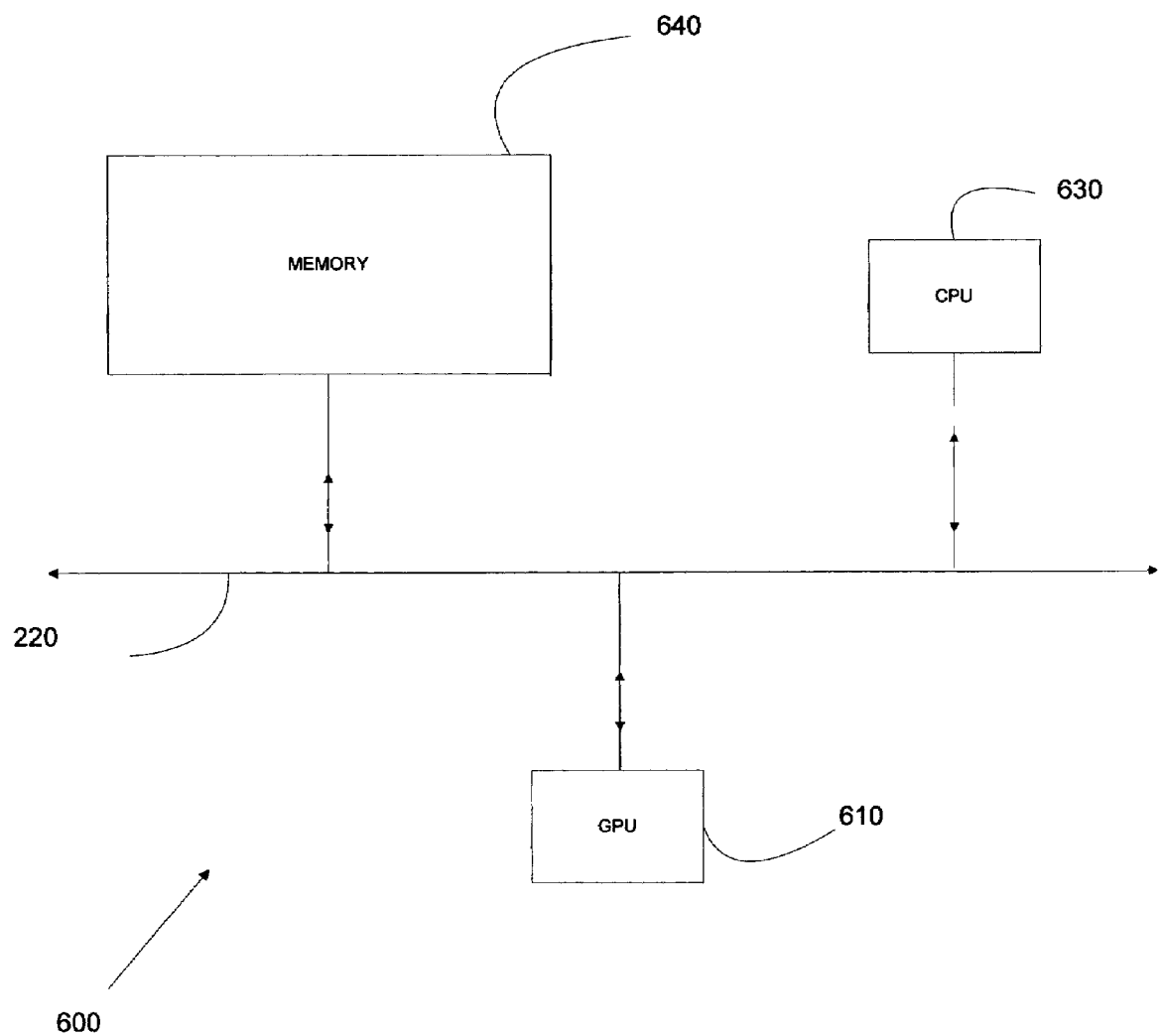
FIG. 6 is a schematic diagram illustrating another embodiment of a computer platform.

Likewise, for this simplified embodiment, system 200 comprises a CPU 230 and a GPU 210. In this particular embodiment, memory 240 comprises random access memory or RAM, although the claimed subject matter is not limited in scope in this respect. Any one of a variety of types of memory currently known or to be developed may be employed. It is noted that memory 240 includes frame buffer 250 in this particular embodiment, although, again, the claimed subject matter is not limited in scope in this respect. For example, FIG. 6 illustrates an embodiment where like reference numerals designate corresponding aspects. In embodiment 600, however, frame buffer 650 does not reside within memory 640. Communication between various system elements takes place via bus 220 in this particular embodiment, as is further illustrated in FIG. 2.

It is worth repeating that FIG. 2 is simply provided for purposes of illustration and is not intended to limit the scope of the claimed subject matter in any way. A multitude of architectures for a system that includes a GPU and a CPU is possible and the claimed subject matter is intended to encompass all such architectures. Although the claimed subject matter is not limited in scope to the embodiment illustrated in FIG. 2 just described, it is noted that this particular embodiment comprises a system employing two co-processors, CPU 230 and GPU 210. Thus, in at least this respect, this embodiment is typical of state-of-the art computing platforms. Thus, as previously described, it is desirable to have the capability to employ such a system to perform high quality graphics processing. However, it is likewise noted that the claimed subject matter is not limited to high quality graphics.

Rendering for film and other high-end applications typically involves a plethora of hidden surface removal or reduction features that have not traditionally been available in graphics hardware: highly supersampled antialiasing, filtered with a high-quality kernel with support wider than one pixel; motion blur and depth of field; order independent transparency with spectral opacities (separate values for red, green, and blue); and/or floating-point output of color, opacity, and any other arbitrary values computed by shaders. Until very recently, real-time graphics hardware has taken a simplistic approach to hidden surface removal: a single z-buffer entry per pixel, 8-bit color depth, and an 8-bit alpha channel to represent coverage and opacity. Even now that some of these restrictions have been lifted, as just described, it has been difficult to get an array of features, particularly at the quality levels desirable for high-end applications.

The context for one embodiment within the claimed subject matter is a Reyes-like architecture, although, of course, the claimed subject matter is not necessarily limited in scope in this respect. See, for example, APODACA, A. A., AND GRITZ, L. 1999. *Advanced RenderMan: Creating CGI for Motion Pictures*. Morgan-Kaufmann; COOK, R. L., CARPENTER, L., AND CATMULL, E. 1987. The Reyes image rendering architecture. In *Computer Graphics (SIGGRAPH '87 Proceedings)*, vol. 21, 95-102. High-order surface primitives (such as NURBS, subdivision surfaces, and polygons), for example, are recursively split until small enough to shade all at once. These patches are discretized into grids of pixel-sized quadrilateral micropolygons. Grids typically contain on the order of 100 micropolygons, and may, thus, be limited to a user-selected size. The grids are possibly displaced, then assigned color, opacity, and optionally other data values at grid vertexes by execution of user-programmable shaders. Finally, the shaded grids are "hidden" to form a 2D image. Embodiments in accordance with the claimed subject matter concern this latter aspect, hidden surface removal of shaded grids of approximately pixel-sized quads, as described in more detail hereinafter.

Thus, for one particular embodiment, image space is divided into rectangular subimages called buckets, see, for example, the previously cited article by Cook et al., 1987, to reduce the working set of both geometry and pixels so that scenes of large complexity may be handled using reasonable amounts of memory. For particular buckets, the grids overlapping that bucket may be rasterized using OpenGL, for example, in one particular embodiment.

As described in more detail hereinafter, one embodiment of a method of processing a video frame using dedicated programmable graphics hardware in accordance with the claimed subject matter includes systematically supersampling, employing user-selected filters with arbitrarily wide support, motion blur, depth of field (DOF), and/or multiple output channels. Likewise, this particular embodiment supports order-independent transparency by employing enhanced depth peeling to allow multi-channel opacity and opacity thresholding, as described in more detail hereinafter. Of course, the claimed subject matter is not limited in scope to this particular embodiment. Many variations of this particular approach are included within the scope of the claimed subject matter.

The handling of transparency, motion blur and depth of field, and arbitrary output channels can lead to large numbers of rendering passes for a particular bucket. Specifically, for such an embodiment, passes=$P_{output} \times P_{motion} \times P_{transparent}$ where $P_{output}$ is the number of output images; $P_{motion}$ is the number of motion blur or depth of field samples; and $P_{transparent}$ is the number of passes to resolve transparency. GPUs are well crafted to rasterize large amounts of geometry rapidly. Large numbers of passes render quickly, generally faster than CPU-only approaches. Hence, this particular embodiment provides advantages over such other approaches.

As indicated previously, in addition to traditional geometric transformation and rasterization, modern graphics processors, such as the ATI Radeon 9800 and NVIDIA GeForce FX, feature (1) significant programmability via vertex and fragment shaders, rapidly converging on the capabilities of stream processors; and (2) floating-point precision through a significant portion of the pipeline. These two facilities are the enablers of embodiments in accordance with the claimed subject matter, as previously suggested and explained in more detail hereinafter.

Figure 3:
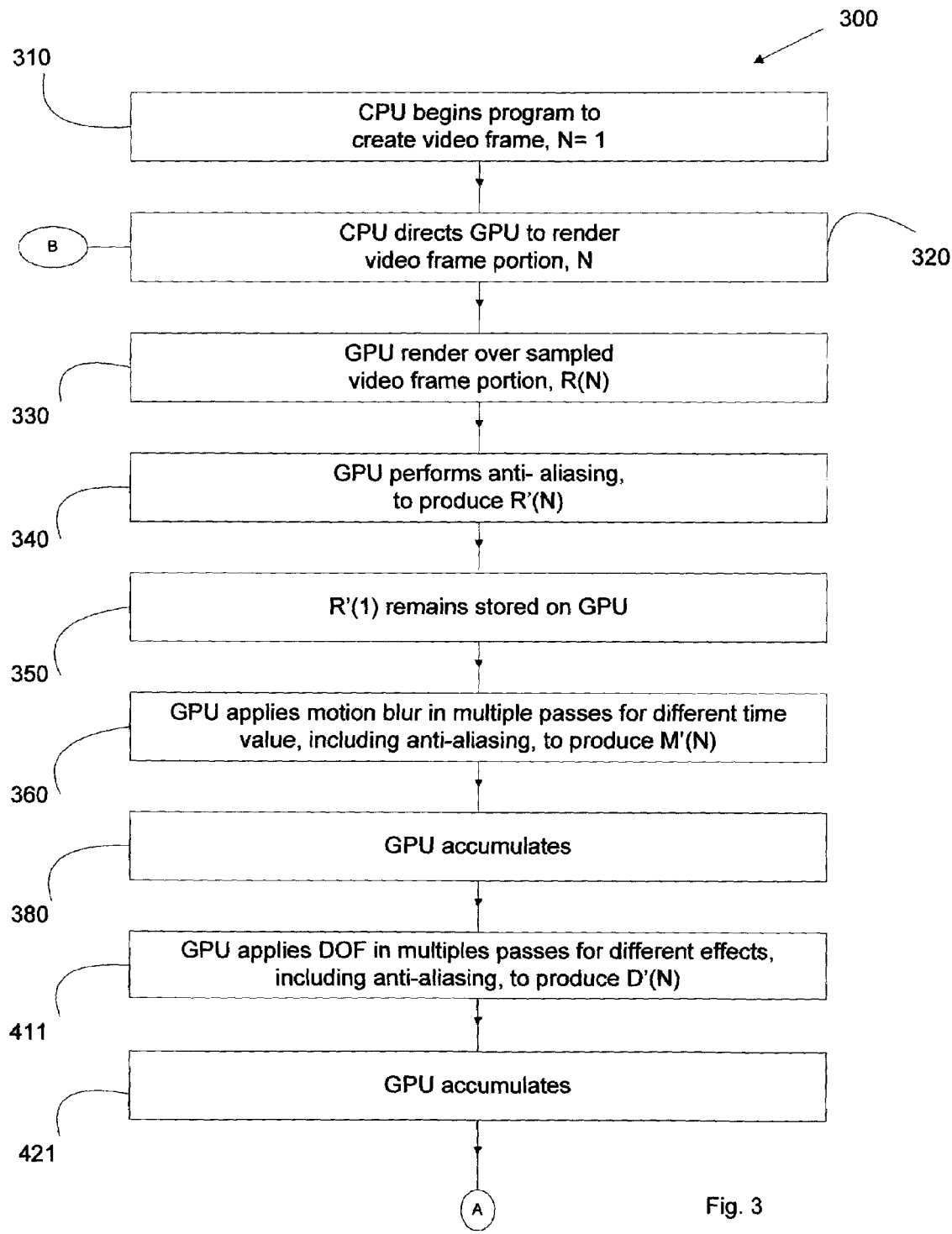
FIGS. 3 and 3A are flowcharts illustrating an embodiment of a method of video processing.
Figure 3A:
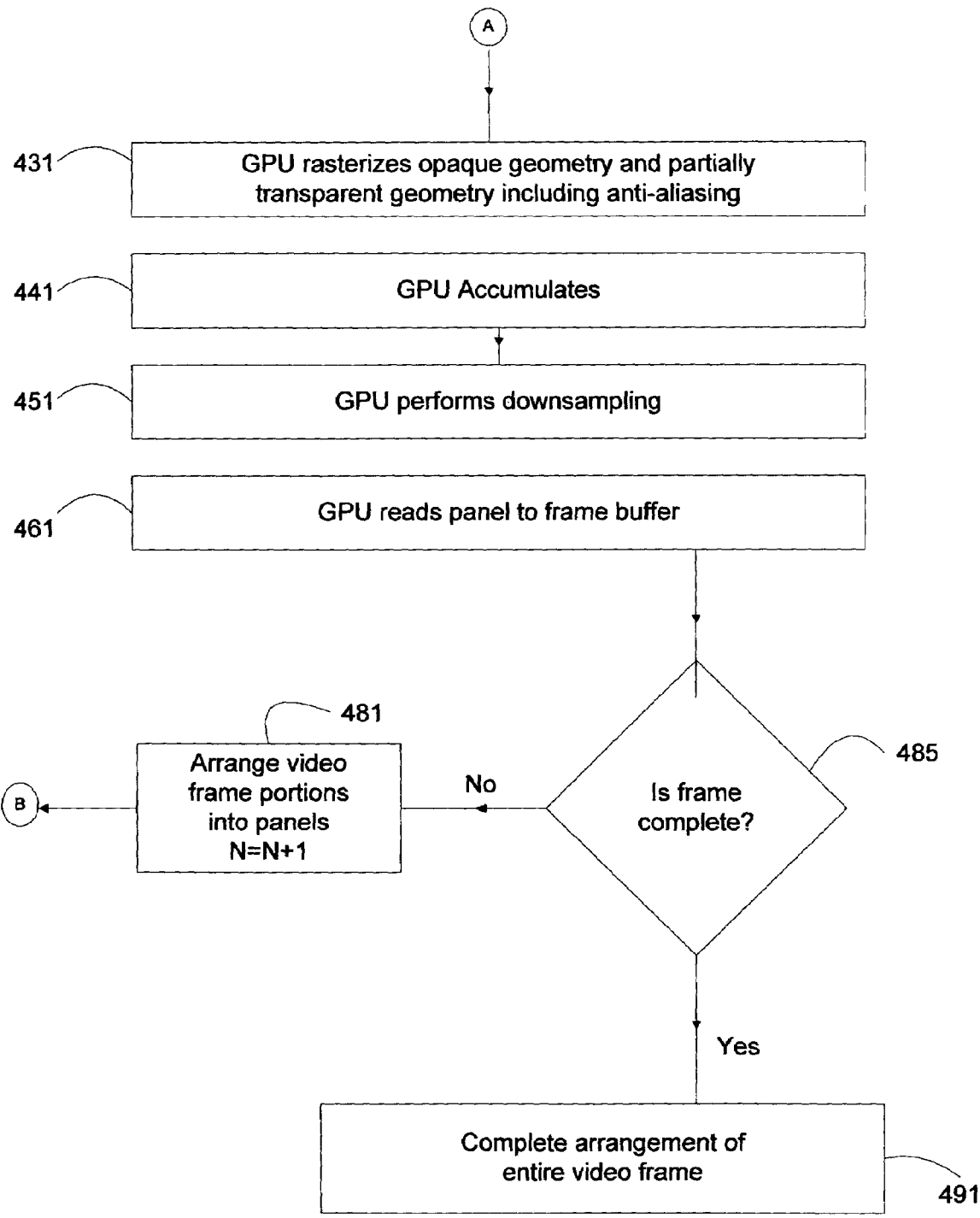

For example, FIGS. 3 and 3A are a flowchart illustrating an embodiment of a method of video processing using dedicated programmable graphics hardware. As discussed in more detail hereinafter, in this particular embodiment, oversampling, filtering and downsampling of a video frame portion are performed. However, a notable difference between FIGS. 3 and 3A and prior techniques for performing graphics processing is that oversampling, filtering and downsampling is performed entirely on dedicated programmable graphics hardware, such as a programmable GPU or a programmable streaming processor, as previously described. Likewise, once downsampling of a video frame portion has been completed, this downsampled video portion is then read from dedicated programmable graphics hardware to random access memory. Typically, although not necessarily, the video frame portion may be read directly to the portion of random access memory that corresponds to the frame buffer.

For simplicity, for this embodiment, processing for a single bucket is described. The process is repeated for other "output images." Thus, it is noted that users' shaders may optionally output other variables besides color. These are rendered into a so-called separate "output image." Examples may include surface normals or separate specular and diffuse images.

Thus, this particular embodiment has the overall splitting-and-dicing form of a Reyes-style approach, as follows:

```
for each output image:
    for every object from front to back:
        if object's bounding box passes the occlusion test:
            if object is too big to dice:
                split object and re-insert split sub-objects
            else:
                dice object into grid of pixel-sized quads
                if diced grid passes the occlusion test:
                    shade the grid
                    render the grid
```

A grid occlusion test enhancement over typical Reyes processes is likewise included above for this embodiment. For this particular embodiment, the term grid includes points, curves and/or surfaces, although the claimed subject matter is not limited in scope in this respect. As previously suggested, grid rendering and occlusion culling, in addition to other processing, are executed entire on the graphics hardware. Thus, although the claimed subject matter is not limited in scope to method embodiment 300 illustrated in FIGS. 3 and 3A, as previously alluded to, FIGS. 3 and 3A illustrate applying depth peeling, motion blurring and depth of field (DOF) processing to the video frame portion and, for this particular embodiment, this processing is performed entirely on dedicated programmable graphics hardware prior to reading the downsampled video frame portion to random access memory.

As illustrated in FIG. 3, at block 310, for this embodiment, CPU 220 begins execution of a program to create a video frame. At 320, CPU 220 directs GPU 210 to render a portion of the video frame by oversampling. At 330, GPU 210 renders the oversampled video frame portion, referred to here as R(1). Although the claimed subject is not limited to a video frame portion that comprises a particular number of pixels or comprises a particular shape, in this particular embodiment, the video frame portion comprises a user specified pixel region of a video image, such as for example, a 16×16 region. Thus, in this example, to achieve anti-aliasing, a 16×16 region is oversampled to produce a 320×320 pixel region, achieving a 20×20 oversampling rate per pixel. Again, as previously described, oversampling is performed entirely on the programmable GPU in this embodiment.

Thus, to render diced grids with high quality on the GPU, in this embodiment, grids or buckets are rendered large, and minified later. In this embodiment, the grids are rendered using standard OpenGL primitives into an image buffer which is larger than the final pixel resolution by a user selected factor. For a typical bucket size of 32×32 pixels, as previously described, the supersampled buffer therefore fits in GPU memory. Thus, buckets limit in-core scene complexity and buffer size in this embodiment, which is desirable here.

Rendering grids large also helps tune the geometry for the GPU. The projected screen size of a grid micropolygon is usually on the order of a single pixel in the final image. However, current GPUs are designed to be most efficient at rendering polygons that cover tens or hundreds of pixels; smaller polygons tend to reduce the parallel computation efficiency of the hardware. Supersampling helps to move grid polygons into this "sweet spot" of GPU performance. For this embodiment, a grid is rendered as quad-strips by an OpenGL gl-DrawRangeElements( ) call. This call reads position and other per vertex texture data as C-style 32-bit floating-point arrays. The use of vertex buffer objects (VBOs) may be employed to improve the transfer of data between CPU and GPU, although the claimed subject matter is not limited in scope in this respect. Shading data may be computed at the resolution of the grid, referred to here as the dicing rate, or at another, higher resolution. If the shading and dicing rates match, then the shaded colors are passed to the GPU as per-vertex data. A full-precision register may interpolate the colors across polygons, resulting in smooth-shaded grid. If the shading rate differs from the dicing rate, so that shading data is no longer per-vertex, then colors may be passed to the GPU as a floating-point texture instead. Sending the texture to the GPU and then sampling it for particular fragments is slower than passing a color per vertex, however.

In this context, therefore, oversampling amounts to rendering a large 320×320 pixel image that corresponds to a user specified video frame portion, such as, for example a 16×16 region, once the larger 320×320 pixel image is downsampled, as described in more detail hereinafter. The image may be filtered to address potential aliasing, producing R(1)', as indicated by 340, for example. For this particular application, for example, the Nyquist frequency is not known in advance. Therefore, sampling to produce a relatively large number of pixel values and filtering the oversampled image reduces the risk of aliasing. See, for example, the previously referenced text, *Computer Graphics: Principles and Practice*. Again, this is performed entirely on programmable GPU 210. In particular, a fragment program is executed by the GPU. For example, the oversampled image being filtered may be stored as a texture map and the filter may then be applied to the pixel values of the latest image as a fragment program.

An aspect of this particular embodiment includes retaining the oversampled or supersampled image on the programmable GPU for further processing, before storing it in RAM. For this particular embodiment, processing is performed on separate portions of a video frame image, such as on user specified regions, such as, for example, a 16×16 pixel region, although the claimed subject matter in not limited in scope in this respect. In contrast, typical graphics processing applied in other contexts, even for a programmable GPU, is applied to an entire video frame, rather than to portions of the video frame.

Although the claimed subject matter is not limited in scope to applying processing to separate video frame portions, processing the video frame in this manner provides a number of advantages. As previously suggested, it permits a healthy portion, if not all, of the processing to be performed entirely on the programmable GPU. Dedicated programmable graphics hardware is able to execute arithmetic processes more efficiently than a general purpose CPU. Likewise, reading the results from dedicating programmable graphics hardware to random access memory is typically a relatively slow process. Thus, by performing the processing on the dedicated hardware first, including oversampling, and downsampling, as explained in more detail hereinafter, prior to reading the result from the dedicated programmable graphics hardware to random access memory, provides greater performance in terms of utilization of the dedicated programmable graphics hardware and also reduces the potential for bottlenecks that might otherwise result from reading data from dedicated programmable graphics hardware to memory. More specifically, in this particular embodiment, data is read into memory after being downsampled to a user specified pixel video frame portion, again, such as a 16×16 region, for example. Thus, reading from dedicated programmable graphics hardware and writing to RAM is performed during the latter part of the processing of the video frame portion and a smaller amount of data is transferred, for this particular embodiment.

A similar approach as just described may be employed to perform additional processing techniques, such as motion blur and/or depth of field processing, as previously mentioned and further illustrated in FIGS. 3 and 3A. In this context, motion blur refers to the depiction of moving geometry in a video frame. The approach employed, in this particular embodiment, is to simulate the visual effects that would appear on an individual video frame from having moving geometry in the scene. Thus, the particular object is rendered multiple times in separate oversampled images by applying multiple passes representing different time values, as illustrated by 360. These renderings, thus, take into account the trajectory of the particular object, the shutter speed of the camera, etc.

Here, in particular, motion blur and depth of field may be computed by rendering multiple passes into a supersampled accumulation buffer stored on the GPU, with the number of time and/or lens samples as a user-specified parameter. A pass computes a single instant in time and lens position for the pixels. The passes may be accumulated either by rendering into a single buffer multiple times, or by rendering into multiple buffers substantially simultaneously. The former reduces memory usage at the expense of repeated traversals of the geometry, while the latter increases memory usage for the buffers, but reduces geometry traversals and per-primitive computations and state changes. A multibuffer approach may be problematic when the number of time samples is large, however, because the storage may exceed the available video memory on the GPU. Thus, depending on the embodiment, a multipass technique may be employed to address this issue.

Vertex buffer objects (VBOs) allocate high performance video memory to store per-vertex values, reducing transfer costs when rendering a primitive multiple times. This may improve performance on scenes with lots of motion blur. VBOs occupy either video or CPU memory and, thus, provide a scalable alternative to memory usage when compared to multibuffer memory usage patters. Occlusion-culled grids, described in more detail hereinafter, also provide an opportunity for performance improvement over CPU culling. Motion-blurred bounding boxes are particularly inefficient for occlusion culling, whereas grid culling at a time sample is easily implemented during standard motion blur rendering. Of course, grid culling may also be beneficial in situations other than for motion-blurring as well.

As is known, depth of field results in a scene point resolving to a circle of confusion in the image. For an ideal lens, the radius r of the circle of confusion is proportional to $|1/z-1/f|$, where f is the focal distance. See, for example, POTMESIL, M., AND CHAKRAVARTY, I. 1981. A lens and aperture camera model for synthetic image generation. *Computer Graphics* (*SIGGRAPH '81 Proceedings*), vol. 15, 297-305. To simulate this, in this embodiment, a pass may render a lens position (cx,cy) sampled from a unit disk. The GPU vertex program may offset the vertex position by r times the lens position, as follows:

$$r = A/z - B$$

$$P.xy += r * c.xy$$

where A and B are constants precomputed from f. Of course, the claimed subject matter is not limited in scope to this particular approach. Furthermore, sampling shutter times and lens positions substantially simultaneously for the whole bucket, as opposed to having the time and lens correspondence differ for every pixel, may lead to artifacts at low sampling rates. For this embodiment, however, with a sufficiently high number of passes, noticeable artifacts may not occur. Alternately, for another embodiment, it is possible to compute passes covering the full cross-product of times and lens positions.

These different renderings or oversampled images may also be filtered to address aliasing and are combined or accumulated on the programmable GPU to produce M(1)'. In 380, the programmable GPU may accumulate the oversampled images that have been created, such as R(1)' and M(1)'. See, for example, "The Accumulation Buffer: Hardware Support for High-Quality Rendering," P. Haeberli and K. Akeley, Computer Graphics, Volume 24, Number 4, August 1990, pp 309-318. The *Accumulation Buffer* describes antialiasing, motion blur, and depth of field effects by accumulating weighted sums of several passes, where each pass is a complete rerendering of the scene at a different subpixel offset, time, and lens position, respectively. Direct hardware support has not yet included full 32-bit floating point precision, but programmable GPUs can use fragment shaders to apply this technique at floating point precision, although at the "expense" of sending geometry to the GPU once per spatial filter sample. In contrast, supersampling avoids this expense.

For this embodiment, simulating depth of field (DOF) effects are illustrated at 411. As described above, for a particular object in the video frame or scene, the object may be jittered within a circle of a particular radius, for example, where the radius is determined by the distance of the object from the lens of the camera. Thus, in different passes, different geometric offsets may be executed in this manner. Again, these results are rendered, filtered to address aliasing and accumulated entirely on dedicated programmable graphics hardware to produce D(1)', as illustrated by 411. As discussed previously, again, these oversampled regions, such as D(1)', M(1)', and R(1)', may then be combined or accumulated on the programmable GPU, illustrated by 421. As shall be described in more detail below, occlusion queries against the Z buffer may be employed in this particular embodiment to assess geometry that will not appear in the video frame portion.

After rendering the primitives for a single time and lens offset, the resulting pass may be accumulated into the final image buffer using a simple full screen fragment program that does a weighted add of the frame buffer into the final image. The colors in the final image, for example, may be weighted by the factor w=1/passes. After running the full screen accumulation fragment program, the resulting frame buffer may be stored in a persistent texture for the following pass. On the final pass, the result may be downsampled using a two pass filter and read back to the CPU, as described in more detail below. However, again, this is simply one example embodiment and the claimed subject matter is not limited in scope to this particular approach.

Before discussing downsampling in detail, occlusion culling and handling transparency for this embodiment is addressed. MAMMEN, A. 1989, Transparency and antialiasing algorithms implemented with the virtual pixel maps technique, *IEEE Computer Graphics & Applications* 9, 4 (July), 43-55, suggests an occlusion culling approach. In this approach, once an object no longer affects the current pass, it is dropped for subsequent passes. In this particular embodiment, before an object is split, diced, or shaded, its bounding box is tested to see whether it is completely occluded by objects already rendered, see, for example, the previously cited article Apodaca and Gritz, 1999. If so, it is culled.

To improve culling, objects are processed in roughly front-to-back order, using a heap data structure ordered by the near z values of the objects' camera space bounding boxes. In a high-quality renderer, shading tends to be more "expensive" than occlusion testing, since it may include texture lookups, shadows, or even global illumination. So occlusion culling before shading may produce improved performance benefits. CPU-based renderers typically maintain a hierarchical z-buffer for occlusion testing. By contrast, for this embodiment, the renderer uses the GPU hardware to occlusion test against the full z-buffer, via the OpenGL occlusion-query operations. Occlusion-query returns the number of fragments that passed the z-buffer test between the query start and end calls. In other words, it returns the number of visible fragments. In this embodiment, therefore, writes to the frame buffer are turned off, an occlusion-query is begun, the bounding box is rendered, then the query is ended. If the query reports zero visible fragments, the object is culled. The bounding box occlusion cull before objects are diced is similar to CPU-based approaches. But later, after the object is diced (but before it is shaded), occlusion cull again takes place using the actual grid geometry. This test would be quite "expensive" on the CPU, but GPUs rasterize quickly. Grid culling is especially effective near silhouette edges, where grids behind the silhouette very often have a bounding box that spills out past the silhouette. Grid culling may also assist when an object's bounding box pokes out from behind other geometry, but the actual object does not (e.g., two concentric spheres with slightly different radii). Thus, grid culling provides a potential performance boost. It is noted that the terms grid culling, occlusion culling and occlusion query may be used interchangeably depending on the particular context.

Likewise, PC bus architectures in current use allow greater data bandwidth to the GPU than back from it. Occlusion-query fits this mold well, since it returns a single integer. However, the GPU finishes rendering the primitives before the occlusion-query result is available. Thus, frequent queries may tend to result in the GPU operating at reduced efficiency, although some latency may be hidden by careful ordering of operations. Thus, as described above, for this embodiment in accordance with the claimed subject matter, occlusion queries against the Z buffer may be employed by the GPU to assess geometry that will not appear in the video frame portion.

Transparency may be addressed in an analogous manner in this particular embodiment, as illustrated by 431, although scenes with partially transparent surfaces, possibly mixed with opaque surfaces, are challenging. Methods that involve sorting surfaces in depth are problematic because intersecting surfaces may have to be split to resolve depth ordering. A depth peeling method is described in general in the previously cited Mammen article, 1989, and is discussed for current GPUs in EVERITT, C. 2001. Interactive order-independent transparency. Tech. rep., NVIDIA Corp. (http://developer.nvidia.com/), to address order-independent transparency on the GPU.

Depth peeling may be applied to render grids that may be transparent and may overlap in depth and screen space. Standard depth peeling comprises a multipass method that renders the nearest transparent surface at each pixel in the first pass, the second nearest surface in the second pass, etc. Each pass is composited into an RGBAZ "layers so far" buffer that accumulates the transparent layers already rendered. Each pass renders the whole scene using ordinary z-buffering, with an additional test that only accepts fragments that are behind the corresponding z in the layers-so-far buffer. An occlusion query test on each pass indicates whether that layer was empty; if it was, the process halts.

For this embodiment, depth peeling as just previously described is extended in several ways. First, as described in the previously cited Mammen article, 1989, opaque surfaces are processed beforehand into a separate RGBAZ buffer, leaving the transparent grids for depth peeling. Opacity thresholding is performed between batches of transparent surfaces sorted in depth, resulting in improved performance for typical cases. Also, as described in more detail below, spectral opacity is addressed using three passes in this embodiment.

Scenes are typically mostly opaque, in which case rendering opaque surfaces first reduces the number of depth peeling passes. In this embodiment, the remaining transparent grids are occlusion culled against the opaque z-buffer, further reducing depth peeling effort. The opaque z-buffer texture may also be employed as an additional depth comparison during depth peeling, so transparent micropolygons occluded by opaque surfaces typically do not add additional depth peeling passes.

Thus, for this embodiment, an opaque preprocess renders opaque surfaces into the opaque z-buffer. From here, transparent surfaces are rendered, as previously suggested. Grids occluded by the opaque z-buffer are culled. Pass 1 computes RGBAZ of the nearest transparent surfaces (e.g., green); this initializes the layers-so-far buffer. Pass p, p>1, computes RGBAZ of the p-th nearest transparent surfaces. The fragment program for pass p rejects fragments unless they are both behind the layer-so-far buffer's z and in front of the opaque buffer's z; the z-buffer test for pass p selects the nearest of the accepted fragments. The occlusion query test is halted if pass p reports that no fragments were accepted. Otherwise, the RGBA of Pass p is merged under the layers-so-far buffer, and the z of the layers-so-far buffer is replaced with the z of Pass p. It is noted, of course, that this is simply one example implementation and the claimed subject matter is not limited in scope in this respect.

Depth peeling has O(N2) worst-case performance for N grids. If depth peeling took place in batches of some constant size B, the worst case would be O((N/B)B2)=O(BN)=O(N). The problem is that the grids from separate batches may overlap in depth, so simply depth peel the batches independently and compositing the results will not work properly. For this embodiment, this is addressed, by restricting a batch to a specific range of z values, partitioning the z axis so that standard compositing yields correct results. For this embodiment, this may be accomplished with constants clipping planes. Thus, here the list of transparent grids is broken into z-batches of B consecutive grids. The "zmin" of a z-batch is the "zmin" of its first primitive. While depth peeling a z-batch, for this embodiment, this approach including clipping away fragments nearer than the batch's "zmin" or farther than (or equal to) the next batch's "zmin." Grids that cross a zmin boundary are, therefore, rendered with both batches. Thus, a z-batch now produces the correct image for a non-overlapping range of grids that cross multiple zmin planes and appear in multiple z batches.

Due at least in part to the nature of the Porter-Duff over operation, see PORTER, T., AND DUFF, T. 1984. Compositing digital images. In *Computer Graphics* (*SIGGRAPH '84 Proceedings*), vol. 18, 253-259, typically used to accumulate transparent layers, the opacity value will approach but at least typically not equal full opacity. Opacity thresholding therefore is used to approximate opacity values above a user-specified threshold as fully opaque, thus, reducing the effective depth complexity. This meshes nicely with z-batches for this embodiment. After a z-batch is rendered, these pseudo-opaque pixels are identified and their z values are merged into the opaque buffer. Before grids are added to a z-batch, they are occlusion culled against this opaque buffer. Using z-batches and opacity thresholding may, thus, improve performance.

Thresholding results, however, are inexact because the threshold test is performed after an entire z-batch is processed and not as individual fragments are processed. The first grid to push a pixel over the threshold may be in the middle of a batch, so the pixel may still accumulate a few more layers. For this embodiment, occlusion culling may be extended to return the pixel bounding box and the z range of the rendered fragments that passed the occlusion test. The thresholding pass could improve by running it on the bounding rectangle from the previous depth peeling pass. This would allow the test to be applied after a primitive instead of per z-batch, which may reduce error and improve efficiency.

Current GPUs are typically limited to five image output channels typically containing red, green, blue, alpha, and depth. In this embodiment, the transparency process places opacity in the alpha channels, although the claimed subject matter is not limited in scope in this respect. During geometry processing, it is detected whether any primitive contains spectral opacity, as opposed to monochromatic opacity. Hardware supporting multiple draw buffers may render spectral opacity in a single pass. Otherwise, three passes of the transparency process are employed, one for red, green, and blue. During multipass spectral opacity rendering, versions of fragment programs are generated which select an individual spectral opacity channel from input color, and mask off output to the other two channels. Thus, in practice, many fragment programs are employed for the overall depth peeling process. Since the number of combined fragment programs may become large, for this embodiment, fragment programs may be generated "on demand" based at least in part on the state values for a given pass, as illustrated below. Of course, again, this is simply an example embodiment and the claimed subject matter is not limited in scope in this respect.

An example pseudo-code for the transparency rendering loop including depth peeling, z-batch management and opacity thresholding is as follows:

```
for every object from front to back:
    if object's bounding box passes the occlusion test:
        if object is splittable:
            split object and re-insert split sub-objects
        else:
            dice object into grid
            if diced grid passes the occlusion test:
                shade grid
                if grid is transparent:
                    append grid to current z-batch
                    if current z-batch size exceeds threshold:
                        save opaque RGBAZ
                        while not finished rendering all transparent
                        layers:
                            for every transparent grid in z-
                            batch:
                                render transparent grid
                                composite transparent layer under
                                layers so far
                            store accumulated transparent RGBA
                            restore opaque RGBAZ
                else:
                    render opaque grid
if transparent grids were rendered:
    composite accumulated transparent layers over opaque layer.
```

Thus, order independent transparency is implemented by first rasterizing opaque geometry. These images may be rendered in any order, as previously indicated. Partially transparent geometry is rendered after opaque geometry has completed and depth peeling is then applied. As discussed previously with respect to other processing, anti-alias filtering may be applied. Also, again, the images are accumulated and occlusion queries against the Z buffer are employed by the GPU to assess geometry that will not appear in the video frame portion. These aspects are illustrated by 441, for example.

At this point, for this particular embodiment, downsampling may be applied, as illustrated by 451, so that the video portion may achieve the desired resolution for the video frame being created, although, of course, the claimed subject matter is not limited in scope in this respect. Again, processing of the accumulated oversampled images continues to be performed entirely upon the programmable GPU; however, for this particular embodiment, as described in more detail hereinafter, this additional processing may be accomplished using a fragment program that, while generated by the CPU, is then executed on the programmable GPU.

Thus, for this particular embodiment, once a bucket has been completely rendered at the supersampled resolution (wq,hq), it is downsampled to the final pixel resolution (wp, hp) by a two-pass separable filtering process that runs on the GPU and that supports user-selected high quality filters with large support regions. The downsampled image is then read back to the CPU.

The first pass convolves the x filter kernel with the rows of the supersampled image, resulting in an intermediate image of size (wp,hq). The second pass convolves the y filter kernel with the columns of the intermediate image. The fragment program for these passes, in this embodiment, may be generated on the fly using the CPU by unrolling the user-specified filter into straight-line code that includes all filter weights and pixel offsets as numerical constants.

In this particular embodiment, the fragment program implements a filter to permit downsampling using a user-specified filter parameter, as discussed above. In alternative embodiments, it may be desirable to have the user specify the particular functional form of the filter, such as Gaussian, for example, or to permit the user to specify particular points in the frequency response of the filter. The specified filter, by function, length, frequency response, and/or other aspects, depending upon the particular embodiment, may be applied to perform downsampling.

As previously discussed, an aspect of the downsampling for this particular embodiment is that the filter applied to perform the downsampling comprises a filter separable in the x and y dimension. Although the scope of the claimed subject matter is not limited in this respect, this provides an advantage in terms of reducing computational complexity for this particular embodiment. By employing a separable filter, it is possible to downsample the x dimension and y dimensions independently, as described above. Thus, for this embodiment, the rendered image to be downsampled may be stored in texture memory and a fragment program to downsample along the X dimension may be implemented independently of a fragment program downsampling along the Y dimension. If the filter being applied were not separable in x and y, then processing along these two dimensions could not be implemented independently.

Once processing on a video frame portion has been downsampled, that portion may be read from the programmable GPU to random access memory, such as to the frame buffer for this particular embodiment. In particular, pixels values may be read to the portion of the frame buffer that corresponds to the location of the video frame portion in the particular video frame, as illustrated by 461.

For this embodiment, the output image size is padded by the filter radius, so that neighboring buckets can be computed independently and the results summed together, as described in more detail below. At three instructions per source pixel under the supersampled filter, the resulting program fits in current GPUs, for reasonable sampling rates and filter widths. But, as alluded to above, this approach does not handle non-separable kernels very well; with code for each pixel in the area of support, the program could be too long.

Properly handling overlap regions between video frame portions processed by the programmable GPU and read to the frame buffer or other memory is desirable. More specifically, as illustrated by 481, processed video frame portions are arranged in the frame buffer to form the entire video frame. However, for this particular embodiment, it is noted, referring to FIG. 4, that a panel, such as 492, is a subset of a video frame portion. In an alternative embodiment, a video frame portion may be coincident with the panel, of course. Thus, a panel refers to the region of a video frame portion that does not overlap with other video frame portions. For this particular embodiment, FIG. 5 is a schematic diagram illustrating an embodiment 500 of a video frame image formed by arranging a plurality of panels that have been separately processed. However, those panels that have a common border, for example, should be aligned properly or else visual artifacts that may degrade the quality of the overall video frame may be present.

Figure 4:
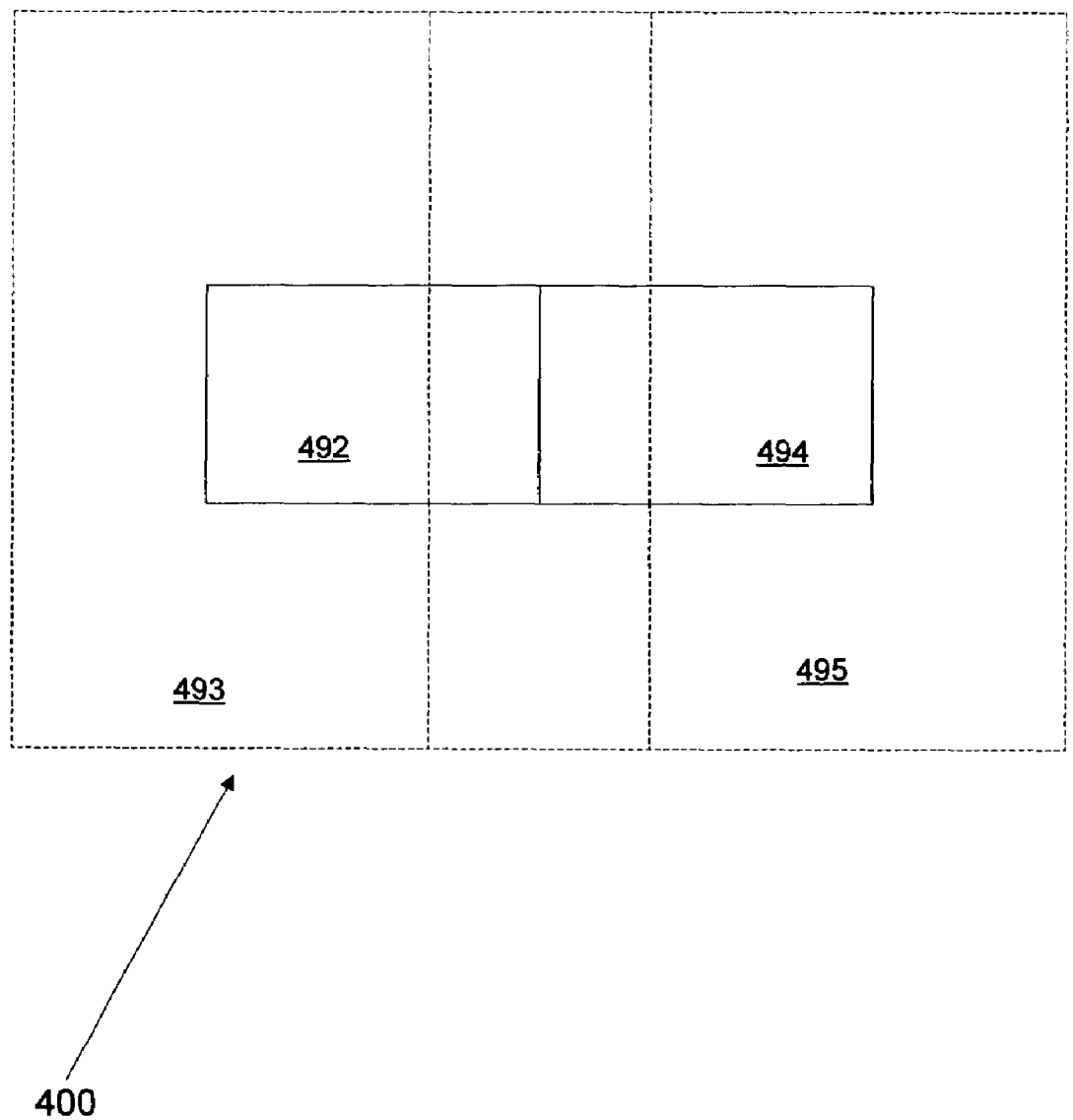
FIG. 4 is a schematic diagram illustrating an embodiment of aligning two immediately adjacent panels in a video frame image.
Figure 5:
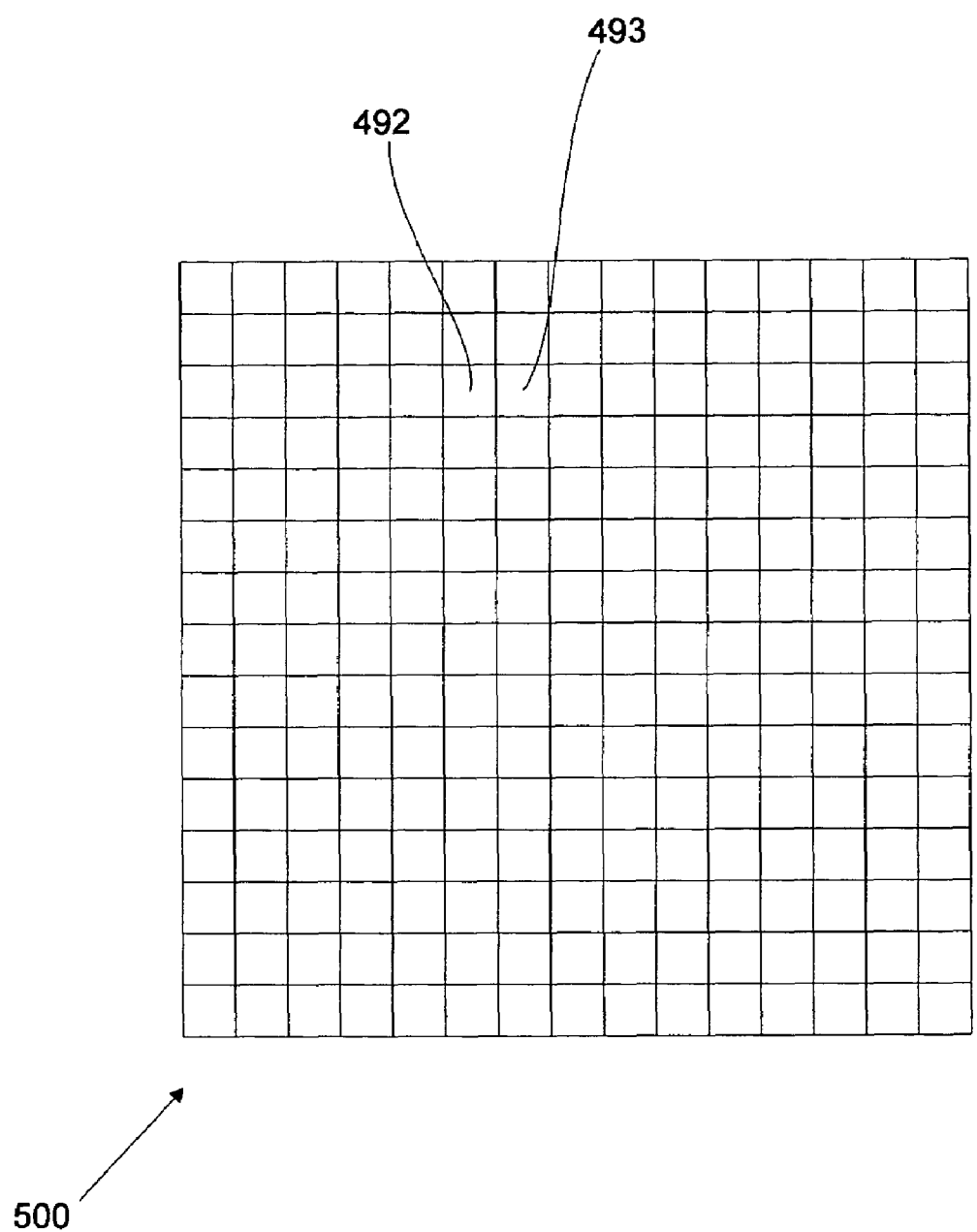
FIG. 5 is a schematic diagram illustrating an embodiment of a video frame image formed by arranging a plurality of panels.

One potential embodiment, here 400, for aligning two immediately adjacent panels, such as 492 and 494, is illustrated in FIG. 4. Thus, for panel 492, a video portion that comprises 492 and 493 is rendered and, for panel 494, a video portion that comprises 494 and 495 is rendered. This additional rendering permits panels 492 and 494 to be properly aligned based at least in part on pixel values of the overlapping portions to reduce the incidence of potential visual artifacts. This example technique, therefore, allows the panels to be arranged so that the incidence of visual artifacts is reduced so as to be either non-existent, imperceptible to the naked eye, or nearly imperceptible, once the entire video frame is assembled, as illustrated by 491 in FIG. 3A, although, this is simply one example technique and the claimed subject matter is not limited in scope to employing this particular approach.

It is, of course, now appreciated, based at least in part on the foregoing disclosure, that software may be produced capable of producing the desired graphics processing. It will, of course, also be understood that, although particular embodiments have just been described, the claimed subject matter is not limited in scope to a particular embodiment or implementation. For example, one embodiment may be in hardware, such as implemented to operate on a device or combination of devices as previously described, for example, whereas another embodiment may be in software. Likewise, an embodiment may be implemented in firmware, or with any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of processing a portion of a video frame using programmable graphics hardware comprising:
    performing depth peeling comprising opacity thresholding in z-batches of the video frame portion entirely on said programmable graphics hardware using, at least in part, a programmable fragment processing stage of said programmable graphics hardware; and
    reading the video frame portion from said programmable graphics hardware.

2. The method of claim 1, wherein the video frame portion is read from said programmable graphics hardware to random access memory.

3. The method of claim 2, wherein said random access memory comprises a frame buffer.

4. The method of claim 1, further comprising oversampling, filtering, and downsampling the portion of the video frame, wherein said filtering comprises applying a filter in accordance with a user-specified filter parameter.

5. The method of claim 4, wherein said performing oversampling, filtering and downsampling includes grid culling performed entirely on said programmable graphics hardware.

6. The method of claim 5, and further comprising;
repeating said performing and said reading for additional portions of the video frame.

7. The method of claim 6, wherein at least some of said additional portions have overlapping regions.

8. The method of claim 4, wherein said performing oversampling, filtering and downsampling includes dicing and shading grids of said video frame, wherein a rate of said dicing is not necessarily the same as a rate of said shading.

9. The method of claim 8, wherein said rates of said dicing and shading are different.

10. The method of claim 1, and further comprising:
applying motion blur and depth of field to the video frame portion.

11. The method of claim 10, wherein said applying motion blur and depth of field to the video frame portion is performed entirely on said programmable graphics hardware using, at least in part, a programmable fragment processing stage of said programmable graphics hardware prior to said reading the downsampled video frame portion.

12. The method of claim 1, wherein said programmable graphics hardware comprises a programmable graphics processor unit.

13. The method of claim 1, wherein the video frame portion comprises a user specified region.

14. An article comprising: a storage medium having stored thereon instructions, that if executed by a programmable graphics hardware, direct the programmable graphics hardware to:
perform depth peeling comprising opacity thresholding in z-batches of the video frame portion entirely on said programmable graphics hardware using, at least in part, a programmable fragment processing stage of said programmable graphics hardware; and
read the video frame portion from said programmable graphics hardware.

15. The article of claim 14, wherein said instructions, if executed, further result in: said video frame portion being read from said programmable graphics hardware to random access memory.

16. The article of claim 15, wherein said random access memory comprises a frame buffer.

17. The article of claim 14, wherein said instructions, if executed, further direct the programmable graphics hardware to: oversample, filter, and downsample the video frame portion, said filtering comprising applying a filter in accordance with a user-specified filter parameter.

18. The article of claim 17, wherein said instructions, if executed, further direct the programmable graphics hardware to: oversample, filter, and downsample by grid culling the video frame portion.

19. The article of claim 18, wherein said instructions, if executed, further direct the programmable graphics hardware to: repeat said performing and said reading for additional portions of the video frame.

20. The article of claim 19, wherein said instructions, if executed, further direct the programmable graphics hardware to: repeat said performing and said reading for at least some of said additional portions having overlapping regions.

21. The article of claim 17, wherein said instructions, if executed, further direct the programmable graphics hardware to: oversample, filter, and downsample the video frame portion by dicing and shading grids of said video frame, wherein a rate of said dicing is not necessarily the same as a rate of said shading.

22. The article of claim 21, wherein said instructions, if executed, further direct the programmable graphics hardware to: dice and shade grids of the video frame wherein said rates of said dicing and shading are different.

23. The article of claim 14, wherein said instructions, if executed, further direct the programmable graphics hardware to: apply motion blur and depth of field to the video frame portion.

24. The article of claim 23, wherein said instructions, if executed, further direct the programmable graphics hardware to: apply said motion blur and depth of field to the video frame portion entirely on said programmable graphics hardware prior to said reading the video frame portion.

25. The article of claim 14, wherein said programmable graphics hardware comprises a programmable graphics processor unit.

26. The article of claim 14, wherein the video frame portion comprises a user specified region.

27. An apparatus comprising:
a general purpose microprocessor; and
a programmable graphics processor unit;
said general purpose and programmable graphics processors being adapted to process a portion of a video frame by being programmed to perform depth peeling comprising opacity thresholding in z-batches of the video frame portion entirely on said programmable graphics processor unit using, at least in part, a programmable fragment processing stage of said programmable graphics hardware and to read the video frame portion from said programmable graphics processing unit.

28. The apparatus of claim 27, wherein said processors are further programmed separately and/or in combination to read the video frame portion from said programmable graphics processor unit to random access memory.

29. The apparatus of claim 28, wherein said random access memory comprises a frame buffer.

30. The apparatus of claim 27, wherein said processors are further programmed to perform oversampling, filtering, and downsampling of the video frame portion, said processors further programmed to implement said filtering by applying a filter in accordance with a user-specified filter parameter.

31. The apparatus of claim 30 wherein said processors are further programmed to perform said oversampling, filtering and downsampling, including grid culling, entirely on said programmable graphics hardware.

32. The apparatus of claim 31, wherein said processors are further programmed to repeat performing and reading operations for additional portions of the video frame.

33. The apparatus of claim 32, wherein said processors are further programmed so that at least some of said additional portions processed have overlapping regions.

34. The apparatus of claim 30, wherein said processors are further programmed to perform said performing oversampling, filtering and downsampling, including dicing and shading grids of said video frame, wherein a rate of said dicing is not necessarily the same as a rate of said shading.

35. The apparatus of claim 27, wherein said processors are further programmed to apply motion blur and depth of field to the video frame portion.

36. The apparatus of claim 35, wherein said processors are further programmed to apply motion blur and depth of field to the video frame portion entirely on said programmable graphics processor unit.

37. The apparatus of claim 27, wherein said programmable graphics processor unit is incorporated in at least one of the following systems: a desktop computer, a mobile computer, a game console, a hand-held device, a wireless communications device, a networked device, a display system, a motherboard, a graphics card, and an integrated circuit chip.

38. An apparatus comprising:

a first means for processing and a second means for processing, said second means for processing comprising a means for graphical processing;

both of said processing means being adapted to process a portion of a video frame by performing depth peeling comprising opacity thresholding in z-batches of the video frame portion entirely on said second processing means using, at least in part, a programmable fragment processing stage of said second processing means and by reading the video frame portion from said second processing means.

39. The apparatus of claim 38, wherein said second processing means is further adapted to operate on a video frame portion comprising any shape and/or any number of pixels.

40. The apparatus of claim 38, wherein said first and second processing means are further adapted to repeat performing and reading operations for additional portions of the video frame.

41. The apparatus of claim 40, wherein said first and second processing means are adapted to process said additional portions so that at least some of said additional portions have overlapping regions.

42. The apparatus of claim 38, wherein said first and second processing means are further adapted to apply motion blur and depth of field to the video frame portion entirely on said second processing means.

43. The apparatus of claim 38, wherein said first processing means is incorporated in at least one of the following systems: a desktop computer, a mobile computer, a game console, a hand-held device, a wireless communications device, a networked device, a display system, a motherboard, a graphics card, and an integrated circuit chip.

* * * * *